United States Patent [19]
Aanstad

[11] 3,745,884
[45] July 17, 1973

[54] CONTROL APPARATUS FOR OPERATING A CONTROL VALVE SERVO-MOTOR

[75] Inventor: Ola J. Aanstad, Chester, Pa.

[73] Assignee: Westinghouse Electric Corporation, Pittsburgh, Pa.

[22] Filed: June 30, 1971

[21] Appl. No.: 158,335

[52] U.S. Cl. .................... 91/374, 91/417, 91/461
[51] Int. Cl. ..................... F15b 9/10, F15b 15/17
[58] Field of Search ...................... 91/374, 461, 417

[56] References Cited
UNITED STATES PATENTS 3,386,343   6/1968   Gray ........................... 91/461
3,511,134   5/1970   Wittren ....................... 91/461

*Primary Examiner*—Paul E. Maslousky
*Attorney*—A. T. Stratton et al.

[57] ABSTRACT

A hydraulic control apparatus for controlling the flow of pressurized working fluid to a hydraulic servo-motor which operates a hydraulic control valve, wherein the control apparatus utilizes two stages of pressure control to position a spool valve, which regulates the flow of working fluid to and from the servo-motor to operate the control valve and a feedback sleeve, which is cooperatively associated with the spool valve and servo-motor to position the servo-motor at each level of control pressure.

10 Claims, 2 Drawing Figures

PATENTED JUL 17 1973

CONTROL APPARATUS FOR OPERATING A CONTROL VALVE SERVO-MOTOR

BACKGROUND OF THE INVENTION

This invention relates to hydraulically positioned steam turbine control valves and more particularly to a hydraulic controller for operating a servo-motor for the control valves.

As the capacity of steam turbines increases the quantity of steam supplied thereto also increases requiring larger size valves and more powerful servo-motors to operate the valves. The positioning devices for the large valves require high rates of flow of hydraulic fluid to satisfy the fast valve positioning necessary for these valves. The hydraulic controlled, thus, must be designed with adequate stability to insure stable operation under all conditions.

SUMMARY OF THE INVENTION

In general, a control apparatus for controlling the flow of a pressurized working fluid to and from a servo-motor in response to a change in pressure of a control fluid, when made in accordance with this invention, comprises a first control device directly responsive to changes in pressure of the control fluid, a second control device responsive to movement of the first control device, a device for controlling the flow of working fluid to and from the servo-motor, the flow control device being responsive to movement of the second control device, and a feedback device for modifying the response of the flow control device in response to movement of the servo-motor.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
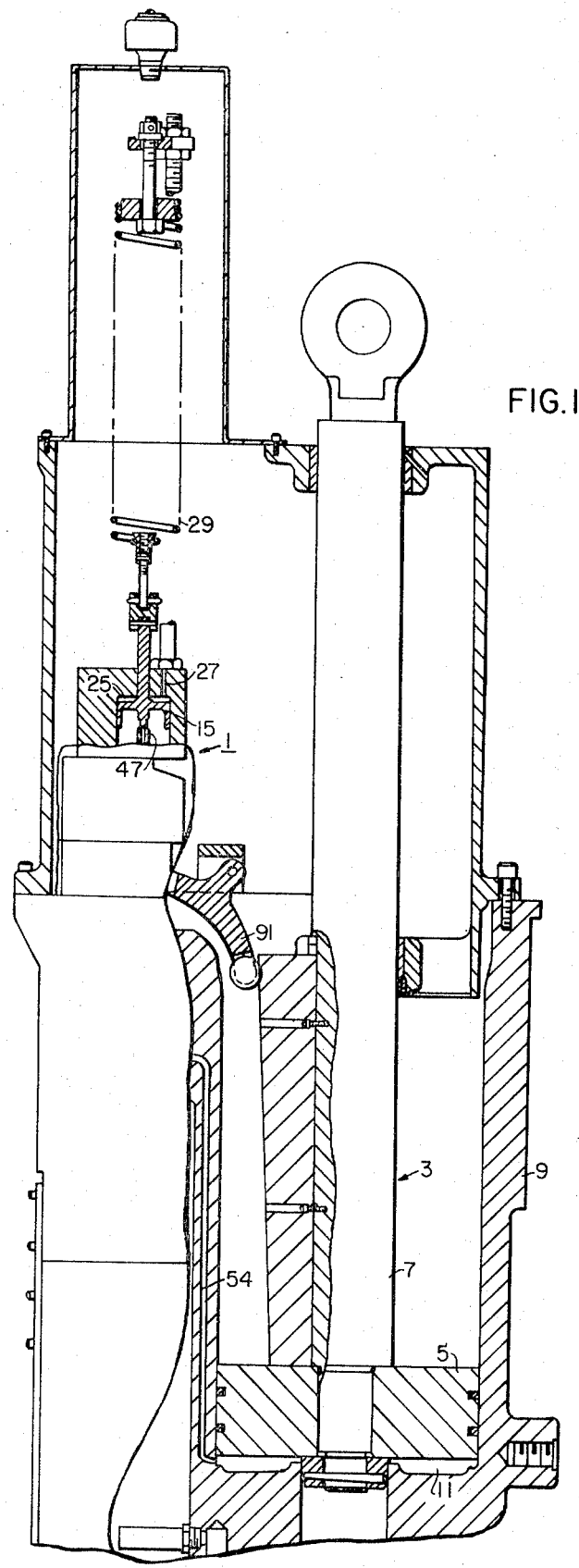
FIG. 1 is a partial sectional view of a hydraulic control apparatus and a servo-motor.

Referring now to the drawings in detail, FIG. 1 shows a hydraulic control apparatus 1 for controlling the flow of pressurized working fluid to and from a servo-motor 3 in response to changes in pressure of a control fluid. As shown in FIG. 1 the servo-motor has a piston 5 and piston rod 7 disposed in a housing 9. The piston rod 7 extends upwardly from the piston 5 and both move in upward direction as working fluid enters a chanber 11 disposed between the housing 9 and one side of the servo-motor's piston 5.

The control apparatus, as shown in the drawings, comprises a first single acting control piston 15 responsive to changes in pressure of the control fluid; a second hydraulically balanced control piston 17, responsive to movement of the first control piston; a spool type flow control valve plunger 19, for controlling the flow of working fluid to and from the chamber 11 of the servo-motor 3, the spool valve plunger 19 being responsive to movement of the second control piston 17; and a feedback sleeve 21 for modifying the response of the spool valve plunger 19 in response to movement of the servo-motor's piston 5 to position the control apparatus for each level of control fluid pressure.

The first control piston 15, as shown in the drawings, is so disposed in a cylinder 23 to form a chamber 25 between the top side of the piston 15 and cylinder 23. Control fluid is supplied to the chamber 25 via an inlet port 27 to bias the piston 15 in one direction, downwardly. A spring 29 biases the piston 15 in the other direction, upwardly. The bias of the spring 29 vaires proportional to the movement of the piston 15 providing a distinct piston location for each pressure level of the control fluid.

The second control piston 17 is a hydraulically balanced piston and is so disposed in a cylinder 30 to divide the cylinder 30 into two chambers 31 and 33. The balance piston 17 has piston rod-like extensions 35 and 37 extending in opposite directions therefrom. An inlet duct 39 supplies pressurized working fluid to the higher pressure or lower side 41 of the balance piston 17 to bias it in an upward direction. An orifice 43, disposed in the piston 17, provides a generally constant rate of flow of working fluid to a lower pressure or upper side 45 of the balance piston 17. The effective area of the lower pressure or upper side 45 is greater than the effective area of the higher pressure or lower side 41 of the balance piston 17, so that by controlling the rate of bleed from the lower pressure or upper side 45 of the balance piston 17, the balance piston 17 may be moved in one direction, downwardly, or the other, upwardly.

The piston-like extension 35 extending upwardly has a duct 47 disposed therein for bleeding working fluid from the lower pressure or upper side 45 of the balance piston 17. The duct 47 is so disposed that an outlet end 49 cooperates with the first piston 15 to control the rate of flow of pressurized working fluid from the lower pressure side 45 of the balance piston and thus causes the balance piston 17 to move in one direction or the other depending on the amount of working fluid bled through the duct 47. A decrease in the amount of working fluid being bled through the duct 47 causes the balance piston 17 to move in one direction, downwardly, and an increase in the amount of working fluid being bled through the duct 47 causes the balance piston 17 to move in the other direction, upwardly.

Figure 2:
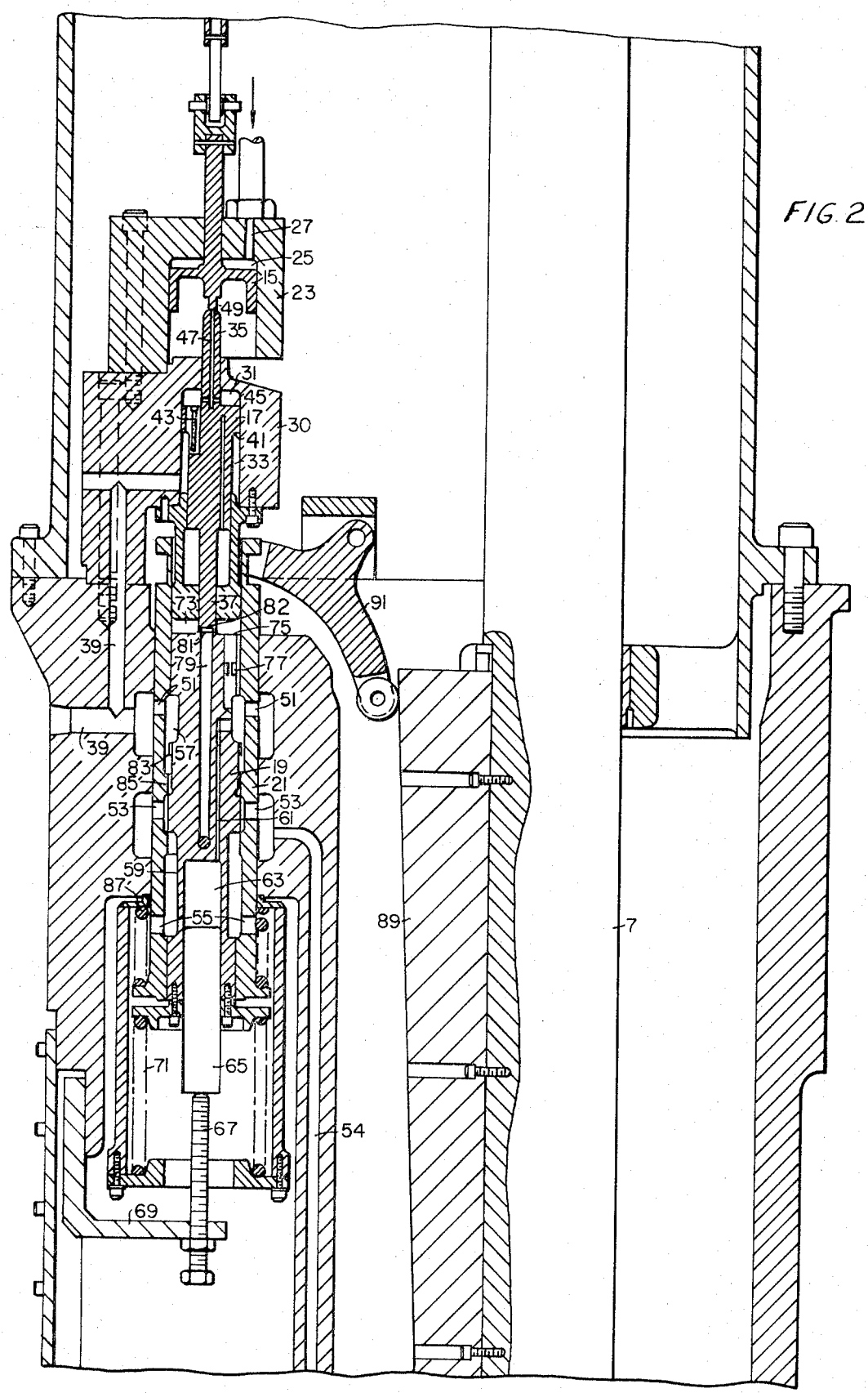
FIG. 2 is an enlarged partial sectional view showing the hydraulic control apparatus.

As shown in FIG. 2, the spool-like valve plunger 19 is slidably disposed in the feedback sleeve 21. The sleeve 21 has supply ports 51, through which pressurized working fluid is supplied from the inlet duct 39, which is in communication with a source of pressurized working fluid (not shown); servo-motor ports 53 in communication with chamber 11 in the servo-motor 3, via duct 54; and drain ports 55 in communication with a drain (not shown).

The spool plunger 19 and sleeve 21 are so disposed that, when the spool plunger 19 moves downwardly relative to the sleeve 21, working fluid from the duct 39 flows through the supply ports 52 and downwardly along annular circumferential grooves 57 in the spool plunger 19 to the servo-motor ports 53, causing the piston 5 and piston rods 7 of the servo-motor to move upwardly, and when the spool plunger 19 is moved upwardly, relative to the sleeve 21, working fluid flows through the servo-motor ports 53, along an annular circumferential groove 59, through the drain ports 55, and to the drain, causing the piston 5 and piston 7 to move downwardly.

The spool plunger 9 is also a balance piston biased in upward direction by pressurized working fluid fed through a duct 61, in communication with the inlet duct 39, through the supply port 51, and to a chamber 63 disposed in the lower portion of the spool plunger. The chamber 63 is formed by the spool plunger 19 and a straight plunger 65, slidably disposed in the chamber 63. The straight plunger 65 reacts against a set screw 67, threaded to a bracket 69, which is fastened to the housing 9. Thus, providing a bias in the upward direction with good dampening characteristics. A spring 71 also biases the spool plunger 19 in the upward direction, so that the spool plunger will connect the servo-motor ports 53 to drain, when the control apparatus is being energized with working fluid, allowing the servo-motor 3 to remain in the closed position as the system is energized.

The spool plunger 19 is biased in one direction, downwardly, by pressurized working fluid in a chamber 73 acting against the upper end 75 of the spool plunger 19. The rate of flow of working fluid to the chamber 73 is controlled by an orifice 77 disposed in the spool plunger 19. A duct 79, extending partially down the center of the spool plunger 19, is in communication with the drain ports 55. The upper end 81 of the duct 79 cooperates with an end 82 of the piston rod-like extension 37 of the balance piston 17 to regulate the flow of working fluid from the chamber 73 to control the position of the spool plunger 19 and thus control the flow of working fluid to and from the servo-motor 3. The balance piston 17 acts in unison with the first piston 15 amplifies the positioning force applied to the spool plunger 19 so that it is greater than the positioning force applied to the balance piston 17.

The annular circumferential groove 57 has steps 83 therein, which register with a step 85 in the sleeve 21, to shut off the flow of working fluid from the supply ports 51 to the servo-motor ports 53, when the fluid in the servo-motor chamber 11 is dumped to actuate the servo-motor more rapidly than possible with the control apparatus, when the servo-motor is utilized to operate a steam control valve for a turbine. The steps 83 and 85 thus prevent working fluid from flowing into the chamber 11, when that chamber is being dumped to rapidly operate the servo-motor.

The sleeve 21 is slidably disposed in the housing 9 and is biased in the downward direction by a spring 87. A cam 89, fastened to the piston rod 7, actuates a cam follower 91, which is cooperatively associated with the sleeve 21 to move the sleeve proportional to the movement of the piston 5 and piston rod 7 of the servo-motor 3. The spring 87 provides a downwardly directed bias on the sleeve 21 causing a positive pressure on the cam follower 91 so that it presses against the cam 89 at all times. The sleeve 21, cam 89 and cam follower 91 cooperate to provide feedback of the position of the servo-motor's piston 5 and piston rod 7 to proportionally relocate the sleeve 21 to balance the control apparatus for each level of control pressure, thus providing a control apparatus with negative feedback.

The hydraulic control apparatus, hereinbefore described, is less sensitive to frictional forces and capable of increased positioning accuracy due to the increased level of the operating forces produced by the amplification of the control pressure provided by the second balance control piston 17, thus providing a more powerful and accurately positioned servo-motor.

What is claimed is:

1. A control apparatus for controlling the flow of pressurized working fluid to and from a servo-motor in response to changes in pressure of a control fluid, said control apparatus comprising
   a first control means directly responsive to changes in pressure of said control fluid,
   a second control means responsive to movement of said first control means,
   said second control means comprises a cylinder, a balanced piston disposed therein and means for providing a generally constant rate of flow of working fluid from a high pressure side of said balanced piston to a lower pressure side of said balanced piston, said balance piston having a greater effective area on the lower pressure side than it does on the higher pressure side,
   means for controlling the flow of said working fluid to and from said servo-motor,
   said fluid control means being responsive to movement of said second control means, and
   feedback means for modifying the response of said flow control means in response to movement of said servo-motor.

2. Control apparatus as set forth in claim 1, wherein the first control means comprises a cylinder and a single acting piston disposed in said cylinder, said single acting piston being biased in one direction by the control fluid and biased in the other direction by a spring whereby the bias in the other direction varies with the movement of said single acting piston.

3. Control apparatus as set forth in claim 1 wherein the first control means regulates the rate of flow of working fluid from the lower pressure side of the balanced piston to control its movement.

4. Apparatus as set forth in claim 1, wherein the means for providing a generally constant rate of flow is an orifice disposed in the balanced piston.

5. Control apparatus as set froth in claim 1, wherein the flow control means comprises a supply port in communication with a supply conduit for pressurized working fluid, a servo-motor port in communication with the servo-motor, a drain port in communication with a drain and a spool-type plunger operable in one direction to allow pressurized working fluid to flow from the supply conduit to the servo-motor and operable in the other direction to allow working fluid to flow from the servo-motor to the drain.

6. Control apparatus as set forth in claim 5, wherein the spool-type plunger is biased in one direction by the working fluid and biased in the other direction by the working fluid and a spring, the working fluid providing the main bias and the spring providing sufficient bias to open the servo-motor port to drain, when the pressure of the working fluid approaches zero.

7. Control apparatus as set forth in claim 5, wherein the spool-type plunger has a step adapted to shut off the supply of working fluid to the servo-motor port when the working fluid is dumped from the servo-motor.

8. Control apparatus as set forth in claim 5, wherein the spool-type plunger is biased in the one direction by the pressure of the working fluid controlled by the second control means and biased in the other direction by the pressure of the working fluid reacting against the housing.

9. Control apparatus as set forth in claim 5, wherein the feedback means comprises a sleeve and means for moving the sleeve proportional to movement of the servo-motor, the sleeve having the supply, servo-motor and drain ports so disposed therein that the apparatus will become balanced for each level of control pressure.

10. Control apparatus as set forth in claim 9, wherein the means for moving the sleeve comprises a cam cooperatively associated with the servo-motor and a cam follower cooperatively associated with the sleeve and cam to move the sleeve proportional to the movement of the servo-motor.

* * * * *